United States Patent
Waagmeester et al.

(10) Patent No.: US 9,721,484 B2
(45) Date of Patent: Aug. 1, 2017

(54) SHOULDER KIT ASSEMBLY FOR CRASH TEST DUMMY

(71) Applicant: Humanetics Innovative Solutions, Inc., Plymouth, MI (US)

(72) Inventors: Kees Waagmeester, Berkel en Rodenrijs (NL); Mark Burleigh, Hemel Hempstead (GB); Apoorva Lakshminarayana, Neckargemuend (DE)

(73) Assignee: HUMANETICS INNOVATIVE SOLUTIONS, INC., Plymouth, MI (US)

( * ) Notice: Subject to any disclaimer, the term of this patent is extended or adjusted under 35 U.S.C. 154(b) by 164 days.

(21) Appl. No.: 14/740,329

(22) Filed: Jun. 16, 2015

(65) Prior Publication Data

US 2015/0371559 A1    Dec. 24, 2015

Related U.S. Application Data

(60) Provisional application No. 62/015,674, filed on Jun. 23, 2014.

(51) Int. Cl.
| | |
|---|---|
| *G09B 23/32* | (2006.01) |
| *G09B 23/34* | (2006.01) |
| *G09B 23/28* | (2006.01) |

(52) U.S. Cl.
CPC ............. *G09B 23/34* (2013.01); *G09B 23/28* (2013.01)

(58) Field of Classification Search
CPC ................................ G09B 23/30; G09B 23/32
See application file for complete search history.

(56) References Cited

U.S. PATENT DOCUMENTS

| | | | | |
|---|---|---|---|---|
| 2,988,823 A | * | 6/1961 | Rosenbloom | G09B 23/34 434/272 |
| 2,995,833 A | * | 8/1961 | Bezark | G09B 23/34 434/274 |
| 3,557,471 A | * | 1/1971 | Payne | G09B 23/32 434/270 |
| 3,664,038 A | * | 5/1972 | Searle | G09B 23/32 434/274 |
| 4,261,113 A | | 4/1981 | Alderson | |
| 4,349,339 A | | 9/1982 | Daniel | |
| 4,409,835 A | * | 10/1983 | Daniel | A61B 5/103 434/274 |
| 4,701,132 A | * | 10/1987 | Groesch | G09B 23/28 434/274 |

(Continued)

*Primary Examiner* — David A Rogers
(74) *Attorney, Agent, or Firm* — Howard & Howard Attorneys PLLC

(57) ABSTRACT

A shoulder kit assembly for a crash test dummy includes a spine interface member for attachment to a spine of the crash test dummy and a scapula for attachment to the spine interface member. The shoulder kit assembly includes a load cell for attachment to the spine interface member for measuring load in a plurality of axes on a shoulder joint and an upper arm assembly having an arm bone made of a plastic material for operative attachment to the scapula. In addition, the shoulder kit assembly also includes a two axis rotational shoulder joint, a relatively soft molded flesh around the plastic arm bone, and provisions for two accelerometers at the shoulder and at the neck T1 location.

20 Claims, 9 Drawing Sheets

(56) References Cited

U.S. PATENT DOCUMENTS

| | | | |
|---|---|---|---|
| 4,773,865 A * | 9/1988 | Baldwin | G09B 23/30 434/267 |
| 5,018,977 A * | 5/1991 | Wiley | G09B 23/32 434/262 |
| 5,317,931 A | 6/1994 | Kalami | |
| 5,526,707 A | 6/1996 | Smrcka | |
| 5,528,943 A | 6/1996 | Smrcka et al. | |
| 5,589,651 A | 12/1996 | Viano et al. | |
| 5,741,989 A | 4/1998 | Viano et al. | |
| 6,206,703 B1 * | 3/2001 | O'Bannon | G01M 17/0078 434/267 |
| 6,451,256 B1 | 9/2002 | Sene | |
| 6,982,409 B2 | 1/2006 | Huang et al. | |
| 7,086,273 B2 | 8/2006 | Lipmyer | |
| 7,508,530 B1 * | 3/2009 | Handman | G01S 5/16 356/614 |
| RE42,418 E * | 6/2011 | Lipmyer | G01B 7/00 73/12.01 |
| 8,407,033 B2 | 3/2013 | Cooper et al. | |
| 8,622,748 B2 | 1/2014 | Wang et al. | |
| 8,840,404 B2 | 9/2014 | Arthur et al. | |
| 9,043,187 B2 | 5/2015 | Pang | |
| 9,355,575 B2 * | 5/2016 | Wang | G09B 23/30 |
| 9,514,659 B2 * | 12/2016 | Been | G09B 23/32 |
| 2004/0099825 A1 * | 5/2004 | Huang | G01M 17/0078 250/559.29 |
| 2004/0101815 A1 * | 5/2004 | Jay | G09B 23/28 434/274 |
| 2005/0126258 A1 * | 6/2005 | Lipmyer | G01M 17/0078 73/12.09 |
| 2007/0058163 A1 * | 3/2007 | Handman | G01C 15/002 356/152.1 |
| 2007/0131043 A1 * | 6/2007 | Frost | G09B 23/32 73/866.4 |
| 2011/0027767 A1 * | 2/2011 | Divinagracia | G09B 23/32 434/274 |
| 2013/0252220 A1 * | 9/2013 | Wang | G09B 23/34 434/274 |
| 2013/0327164 A1 | 12/2013 | Wang | |
| 2014/0190279 A1 | 7/2014 | Been et al. | |
| 2014/0190280 A1 | 7/2014 | Been et al. | |
| 2014/0294485 A1 | 10/2014 | McInnis et al. | |
| 2015/0086957 A1 | 3/2015 | Gibbs et al. | |

* cited by examiner

SHOULDER KIT ASSEMBLY FOR CRASH TEST DUMMY

CROSS-REFERENCE TO RELATED APPLICATION(S)

The present application claims priority to and all the benefits of U.S. Provisional Patent Application No. 62/015,674, filed on Jun. 23, 2014, which is hereby expressly incorporated herein by reference in its entirety.

BACKGROUND OF THE INVENTION

1. Field of the Invention

The present invention relates generally to crash test dummies and, more particularly, to a shoulder kit assembly for a crash test dummy.

2. Description of the Related Art

Automotive, aviation, and other vehicle manufacturers conduct a wide variety of collision testing to measure the effects of a collision on a vehicle and its occupants. Through collision testing, a vehicle manufacturer gains valuable information that can be used to improve the vehicle, authorities examine vehicles to summit type approval, and consumer organizations provide information on vehicle safety ratings to the public.

Collision testing often involves the use of anthropomorphic test devices, better known as "crash test dummies", to estimate a human's injury risk. The dummy must possess the general mechanical properties, dimensions, masses, joints, and joint stiffness of the humans of interest. In addition, they must possess sufficient mechanical impact response similitude and sensitivity to cause them to interact with the vehicle's interior in a human-like manner.

The crash test dummy typically includes a head assembly, spine assembly (including neck), rib cage assembly, abdomen, pelvis assembly, right and left arm assemblies, and right and left leg assemblies. Generally, the arm assembly has an upper arm assembly and a lower arm assembly. The upper arm assembly is typically connected to a shoulder assembly, which, in turn, is typically connected to the spine assembly.

Currently, some of these crash test dummies focus on frontal impact performance. In lateral impact conditions, these same crash test dummies suffer from a stiff metal upper arm bone that protects the rib cage from deformation and can generate high forces on the shoulder assembly. In addition, these crash test dummies do not have measurement channels that can monitor or assess forces on the shoulder assembly. Thus, there is a need in the art for a shoulder kit assembly for a crash test dummy that does not significantly influence the frontal impact shoulder performance of the dummy and allows improved lateral impact shoulder performance of the dummy.

SUMMARY OF THE INVENTION

Accordingly, the present invention is a shoulder kit assembly for a crash test dummy. The shoulder kit assembly includes a spine interface member for attachment to a spine of the crash test dummy and a scapula for attachment to the spine interface member. The shoulder kit assembly includes a load cell for attachment to the spine interface member for measuring load in a plurality of axes on a shoulder joint and an upper arm assembly having an arm bone made of a plastic material for operative attachment to the scapula.

In addition, the shoulder kit assembly also includes a two axis rotational shoulder joint, a relatively soft molded flesh around the plastic arm bone, and provisions for two accelerometers at the shoulder and at the neck T1 location.

Further, the present invention is the present invention is a shoulder assembly for a crash test dummy. The shoulder assembly includes a spine interface member for attachment to a spine of the crash test dummy and a scapula attached to the spine interface member. The shoulder assembly includes a load cell attached to the spine interface member for measuring load in a plurality of axes on a shoulder joint and an upper arm assembly having an arm bone made of a plastic material operatively attached to the scapula.

In addition, the present invention is a crash test dummy including a body and a spine assembly operatively attached to the body. The crash test dummy also includes a shoulder assembly connected to the spine assembly. The shoulder assembly includes a spine interface member attached to the spine assembly and a scapula attached to the spine interface member. The shoulder assembly includes a load cell attached to the spine interface member for measuring load in a plurality of axes on a shoulder joint, a shoulder joint block attached to the load cell to apply friction to the shoulder joint, and an upper arm assembly having an arm bone made of a plastic material attached to the shoulder joint block.

One advantage of the present invention is that a new shoulder kit assembly is provided for a crash test dummy. Another advantage of the present invention is that the shoulder kit assembly is an add-on kit that includes a bone made of a plastic material for attachment to a shoulder joint. Yet another advantage of the present invention is that the shoulder kit assembly includes a three-axis shoulder load cell for measuring forces applied to the shoulder joint. Still another advantage of the present invention is that the shoulder kit assembly includes a lower neck interface ring having provisions to mount accelerometers in a lateral direction at a shoulder joint and a spine at a T1 location to measure accelerations on the shoulder and spine. A further advantage of the present invention is that the shoulder kit assembly improves a shoulder area of a crash test dummy including reduction of shoulder impact peak force with no significant effect on frontal certification results, and allows an easy change from frontal to lateral impact configuration.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
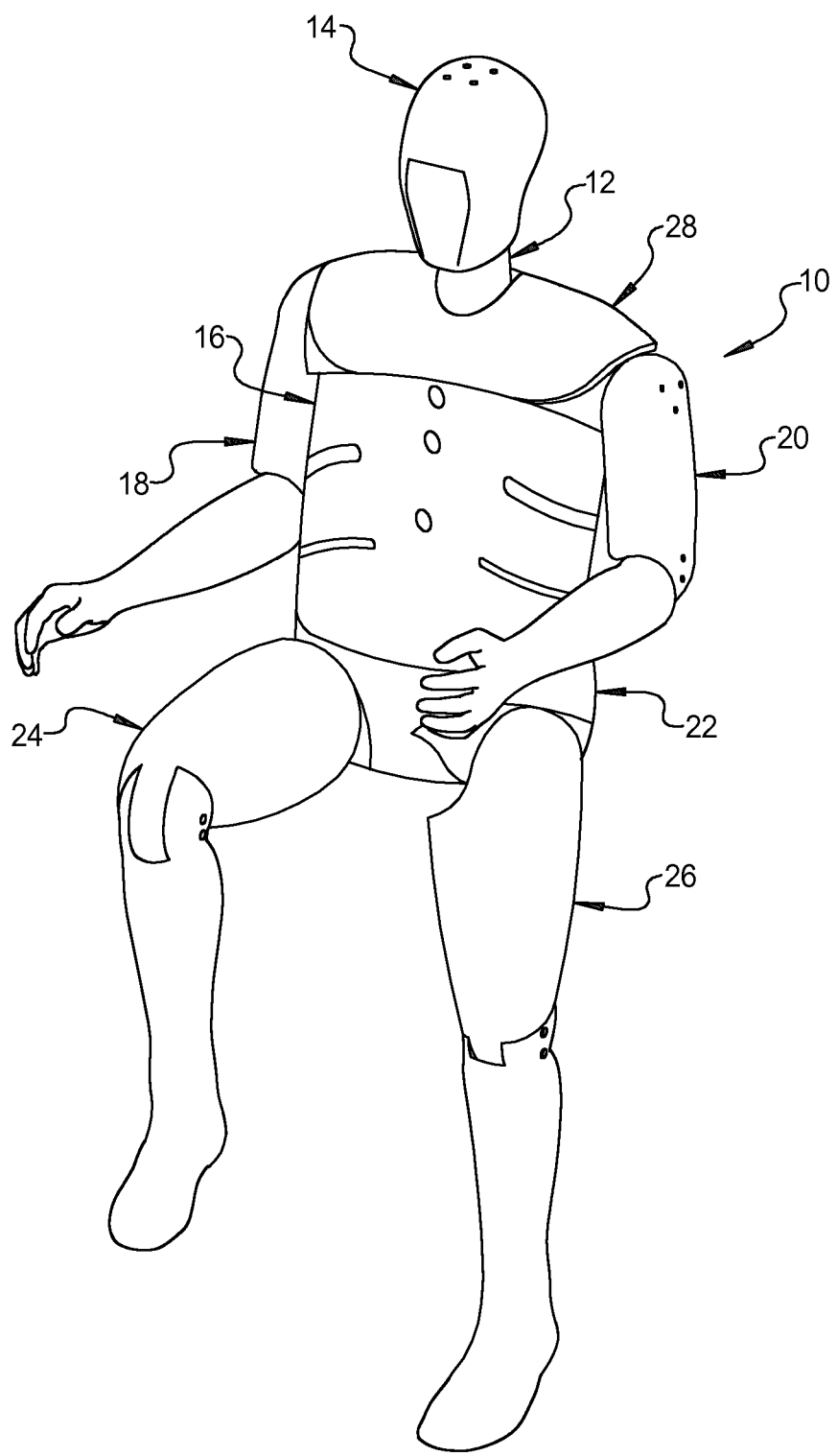
FIG. 1 is a perspective view of one embodiment of a crash test dummy.

Referring to the drawings and in particular FIG. 1, one embodiment of a crash test dummy is generally indicated at 12. The crash test dummy 12 is of a 10.5 year old child and is illustrated in a standing position. This crash test dummy 12 is used primarily to test the performance of automotive interiors and restraint systems for front and rear seat occupants. The size and weight of the crash test dummy 12 are based on anthropometric studies, which are typically done separately by the following organizations, University of Michigan Transportation Research Institute (UMTRI), U.S. Military Anthropometry Survey (ANSUR), and Civilian American and European Surface Anthropometry Resource (CESAR). It should be appreciated that ranges of motions, centers of gravity, and segment masses simulate those of human subjects defined by the anthropometric data.

As illustrated in FIG. 1, the crash test dummy 12 includes a head assembly, generally indicated at 14. The crash test dummy 12 also includes a spine assembly, generally indicated at 15, (FIG. 2) having an upper end mounted to the head assembly 14 and a lower end extending into a torso area of the crash test dummy 12. It should be appreciated that the spine assembly 15 includes a neck 32 to be described attached to the head assembly 14.

The torso area of the crash test dummy 12 also includes a rib cage assembly, generally indicated at 16, connected to the spine assembly 15. The crash test dummy 12 also has a pair of arm assemblies including a right arm assembly, generally indicated at 18, and a left arm assembly, generally indicated at 20, which are attached to the crash test dummy 12 via a shoulder assembly 30 to be described. It should be appreciated that a lower end of the spine assembly 15 is connected to a lumbar-thoracic adapter (not shown), which is connected to a lumbar to pelvic adapter (not shown).

As illustrated in the FIG. 1, the crash test dummy 12 includes a pelvis assembly, generally indicated at 22, connected to the adapter. The crash test dummy 12 includes a right leg assembly 24 and a left leg assembly 26, which are attached to the pelvis assembly 22. It should be appreciated that various components of the crash test dummy 12 may be covered in a polyvinyl skin such as a flesh and skin assembly, generally indicated at 28 and partially shown, for biofidelity of the crash test dummy 12.

Figure 2:
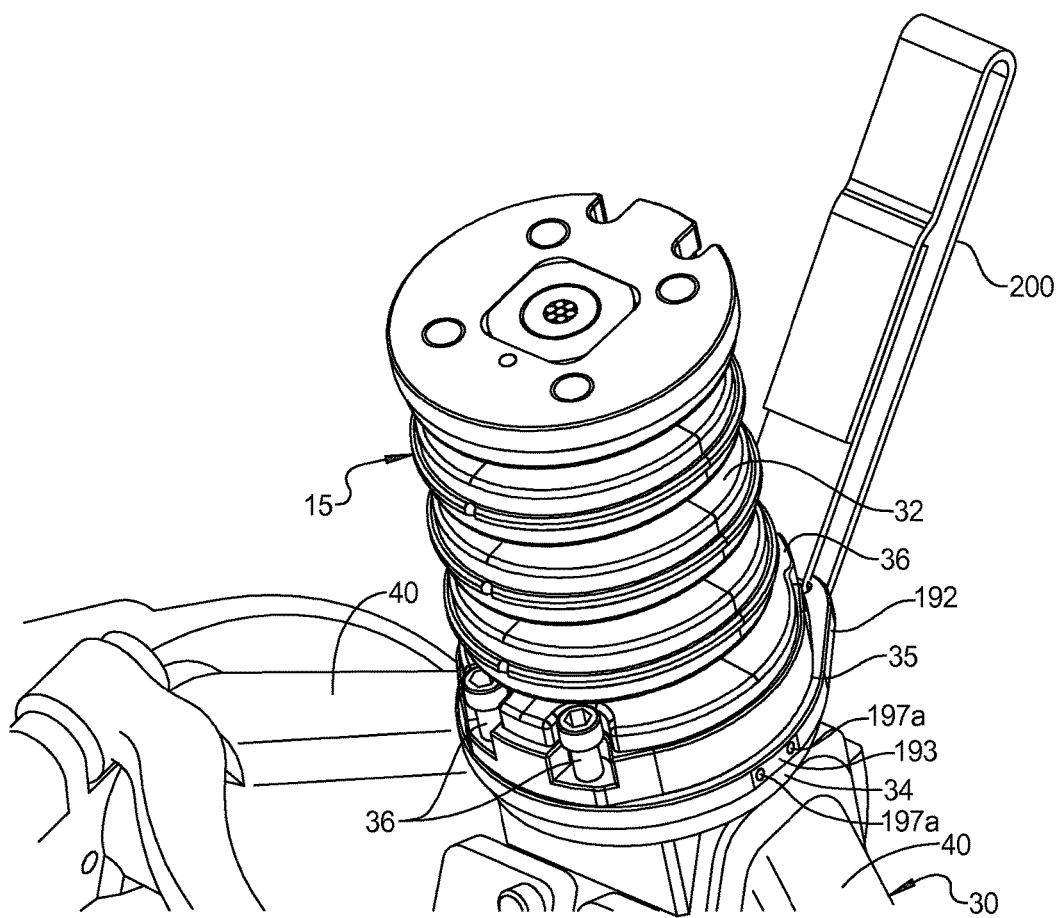
FIG. 2 is a perspective view of a portion of the crash test dummy of FIG. 1.
Figure 3:
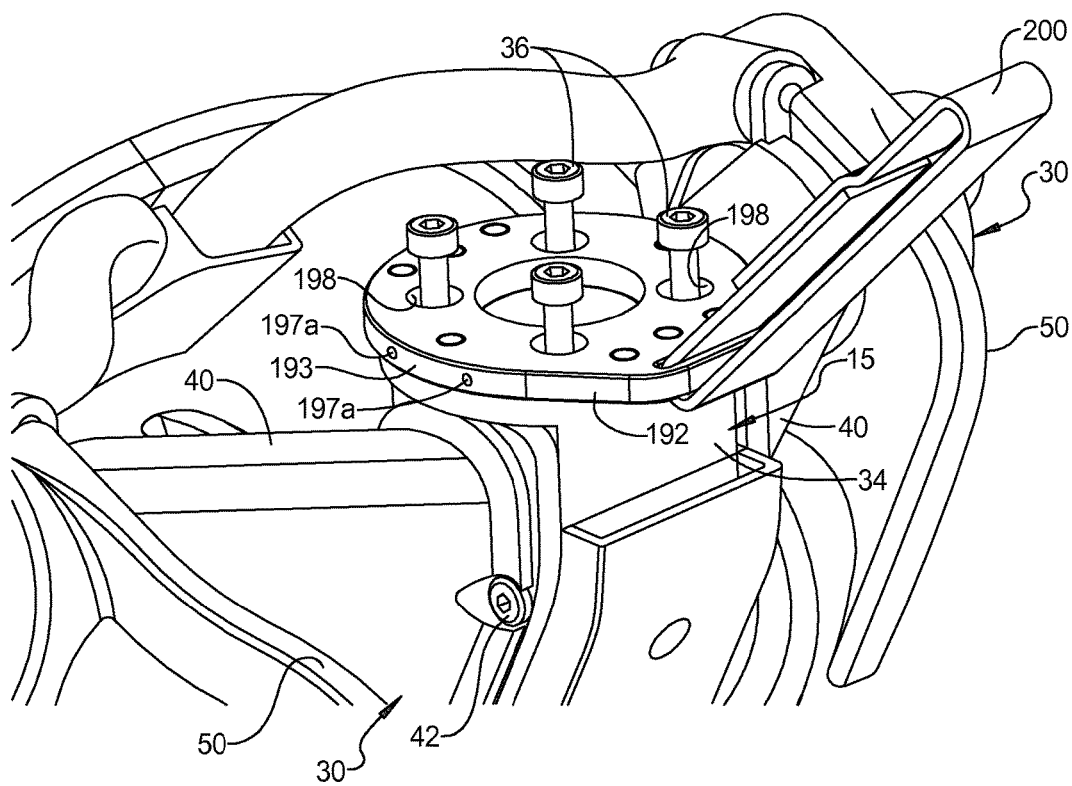
FIG. 3 is a perspective view of a frontal impact shoulder assembly of the crash test dummy of FIG. 1.
Figure 4:
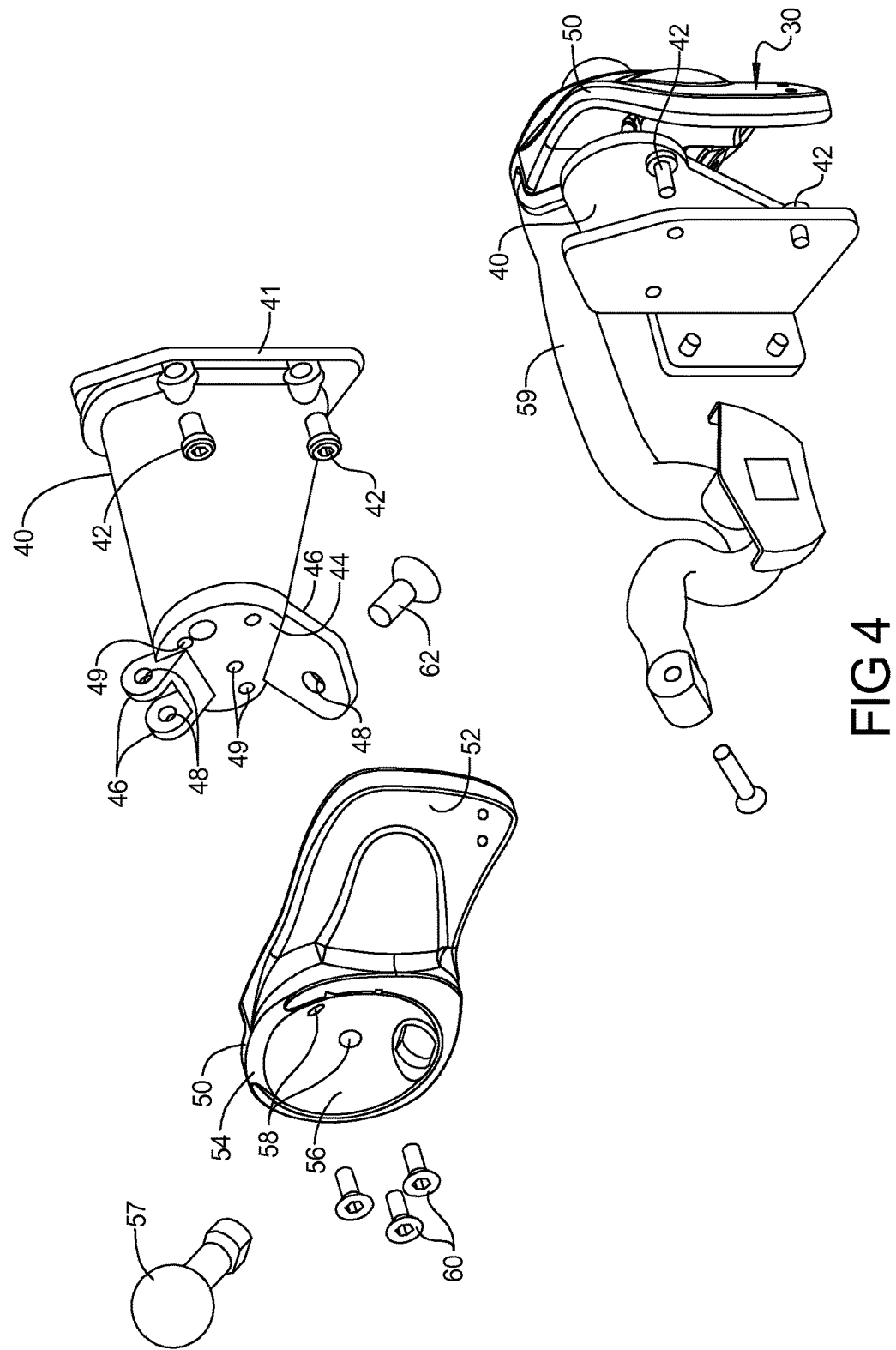
FIG. 4 is an exploded perspective view of the shoulder assembly of FIG. 3.
Figure 5:
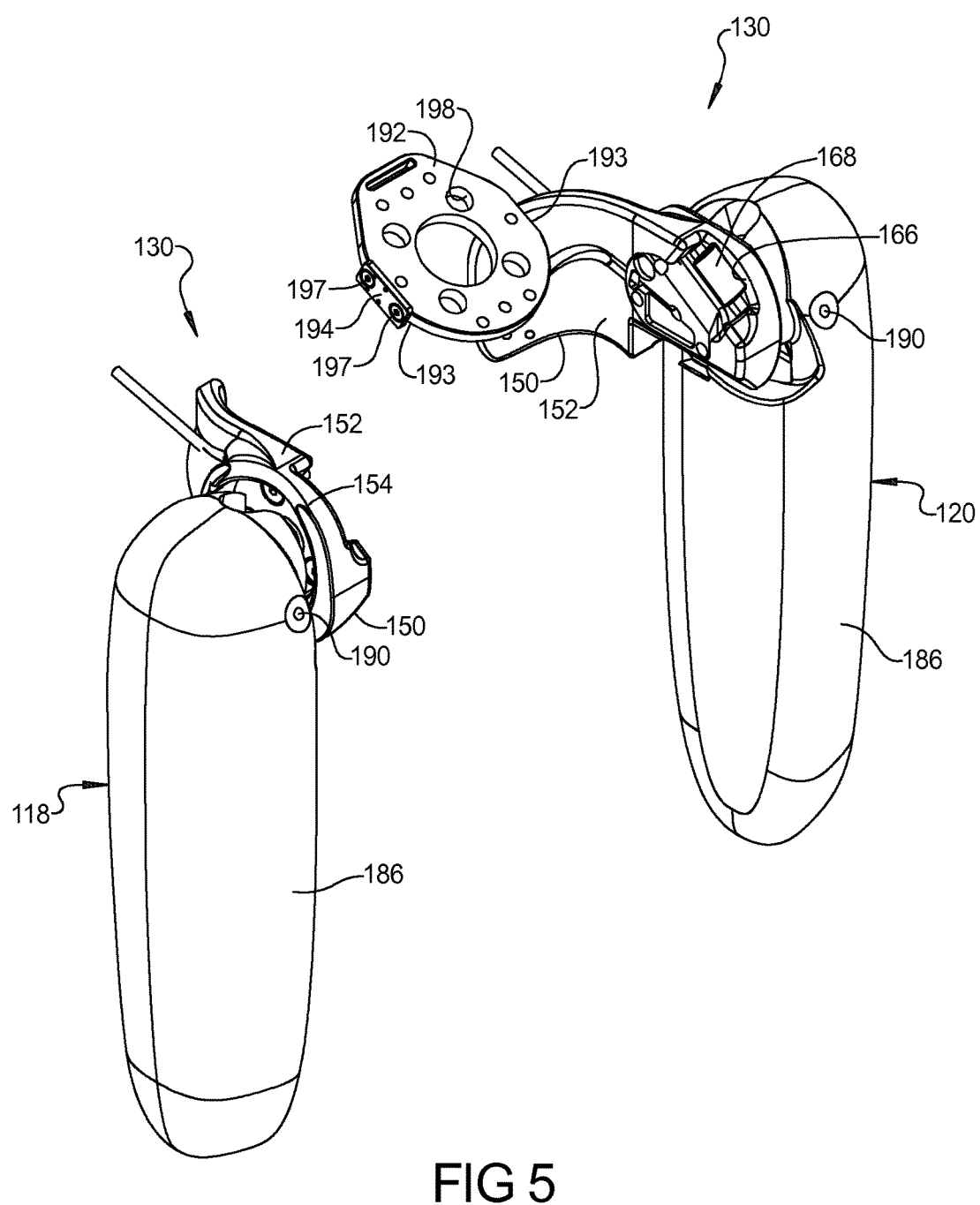
FIG. 5 is a perspective view of a lateral impact shoulder assembly, according to one embodiment of the present invention, for the crash test dummy of FIG. 1.
Figure 5A:
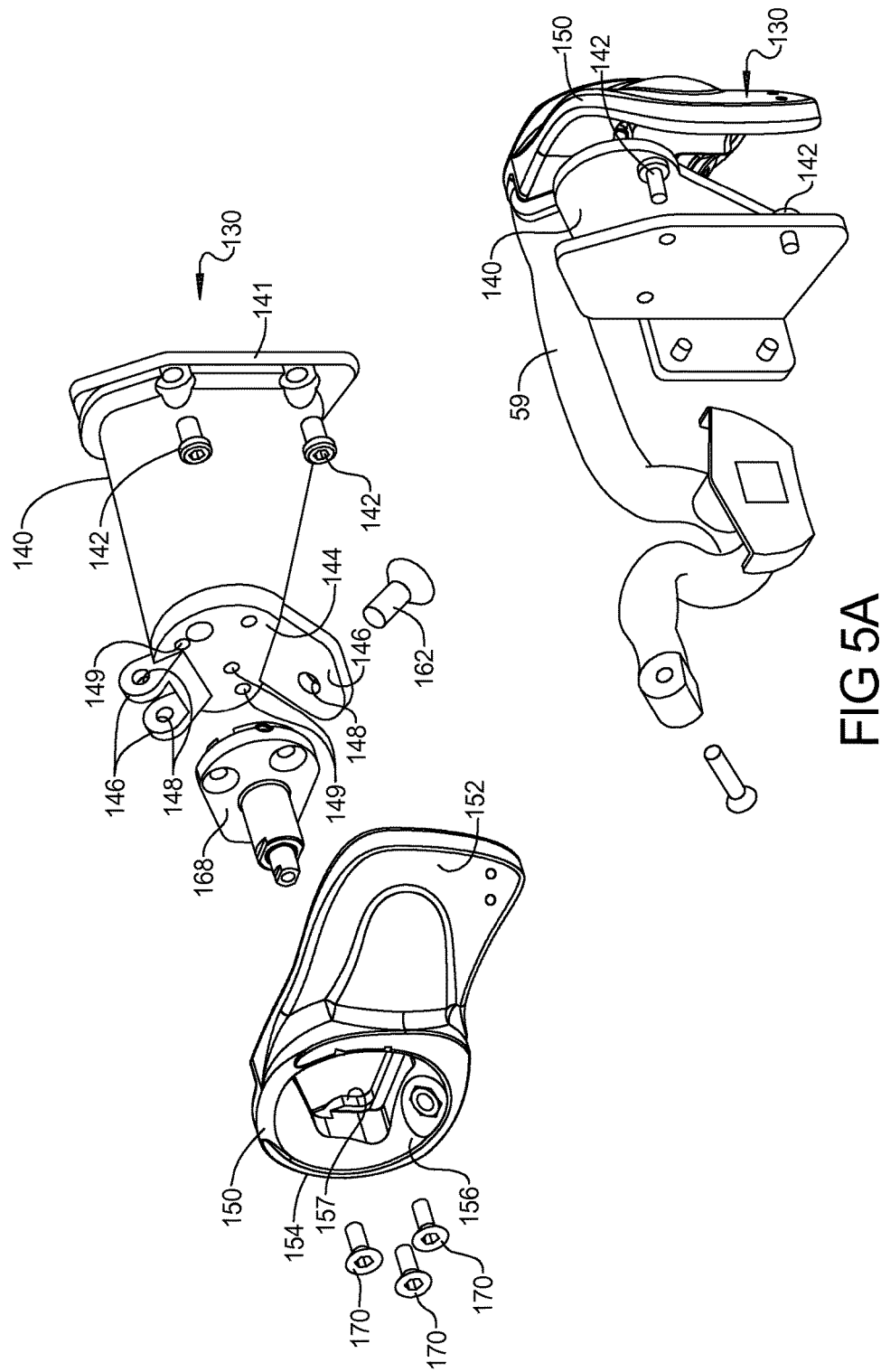
FIG. 5A is an exploded perspective view of a portion of the shoulder assembly of FIG. 5.
Figure 6:
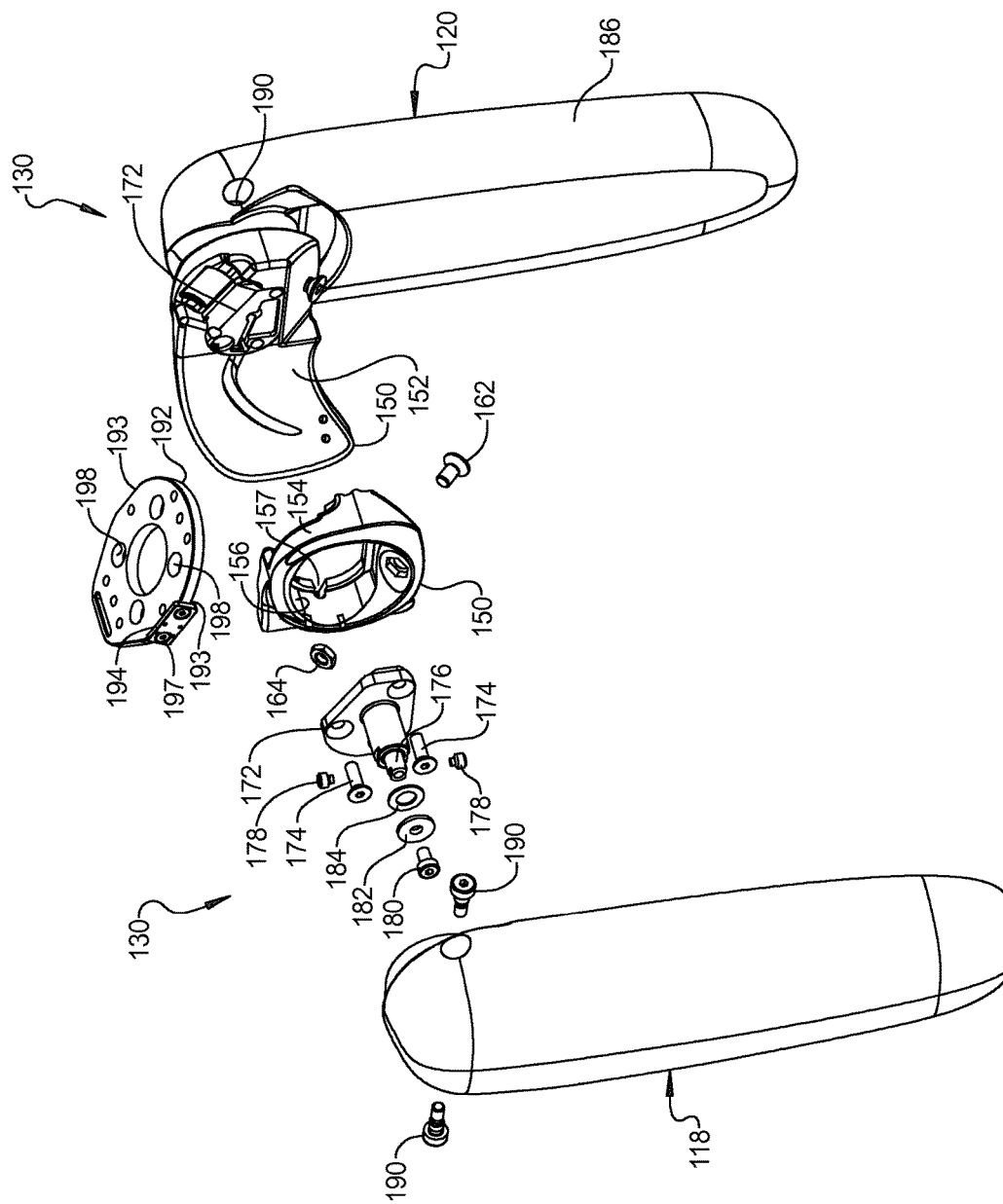
FIG. 6 is an exploded view of the shoulder assembly of FIG. 5.
Figure 7:
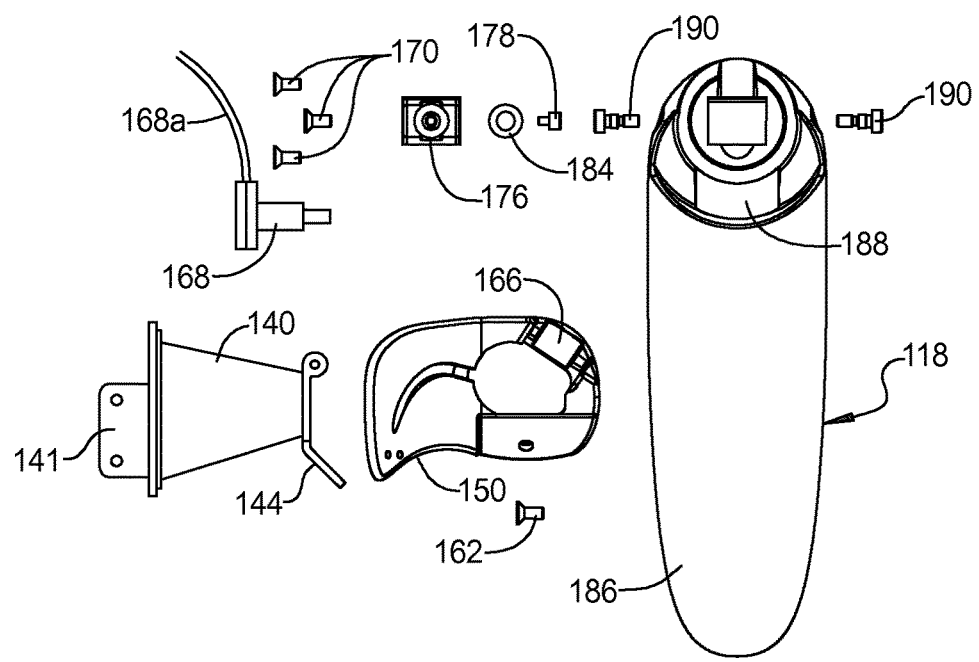
FIG. 7 is a top view of a shoulder kit assembly, according to one embodiment of the present invention, for the shoulder assembly of FIGS. 5 and 6.
Figure 8:
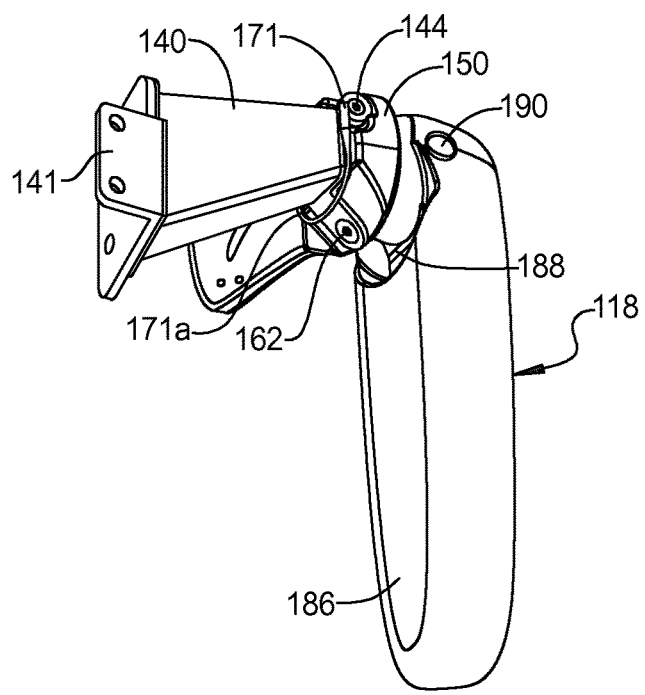
FIG. 8 is a perspective view of the shoulder kit assembly of FIG. 7 assembled into the shoulder assembly of FIGS. 5 through 6.
Figure 9:
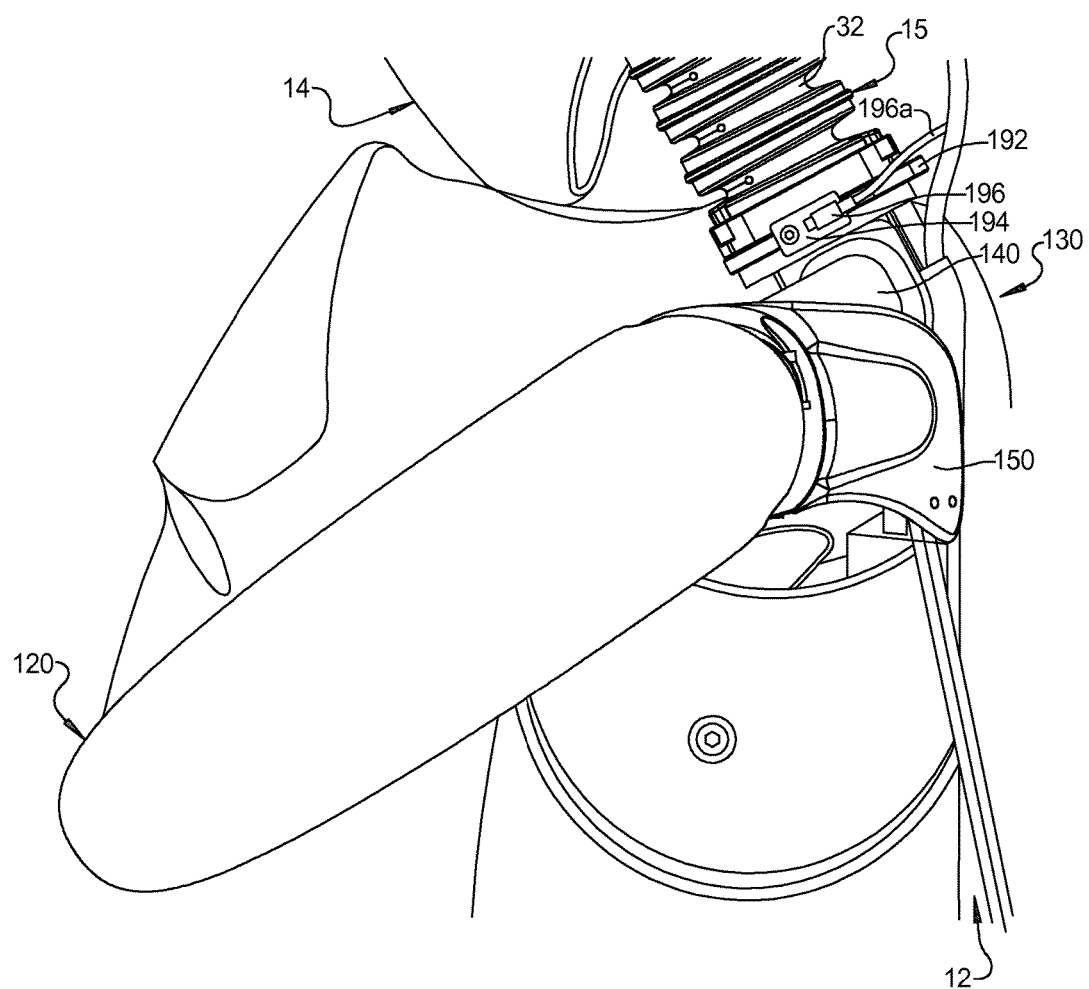
FIG. 9 is a side view of the shoulder assembly of FIGS. 5 through 6 illustrated in operational relationship with a portion of the crash test dummy of FIG. 1.

Referring to FIGS. 2 through 4, a frontal impact shoulder assembly 30 is shown for the crash test dummy 12. The shoulder assembly 30 can be used on both the right hand and left hand positions of the crash test dummy 12 with different parts mirrored on the mid-sagittal plane. In the embodiment illustrated, one shoulder assembly 30 is on the right hand position of the crash test dummy 12 and another shoulder assembly 30 is on the left hand position of the crash test dummy 12. Since the shoulder assembly 30 is symmetric for each of the right hand and left hand positions of the crash test dummy 12, only one shoulder assembly 30 will be subsequently described. It should be appreciated that the subsequent description of the shoulder assembly 30 is the same for both the right hand and left hand positions of the crash test dummy 12.

As illustrated in FIGS. 2 and 3, the shoulder assembly 30 is connected to the spine assembly 15. The spine assembly 15 includes a neck 32 connected to the head assembly 14 and a spine box 34 connected to the neck 32. The neck 32 has a lower end 35 connected to by a suitable attachment such as one or more fasteners 36 to the spine box 34. It should be appreciated that the fasteners 36 threadably engage apertures (not shown) in the spine box 34 to secure the neck 32 to the spine box 36.

As illustrated in FIGS. 3 and 4, the shoulder assembly 30 includes a spine interface member 40 connected to the spine assembly 15. The spine interface member 40 is made of a flexible material such as rubber. The spine interface member 40 has a mounting bracket 41 at one end connected to the spine box 34 of the spine assembly 15 by a suitable mechanism such as fasteners 42. The mounting bracket 41 is made of a metal material such as aluminum. The spine interface member 40 extends axially toward a second end that is smaller than the first end. The spine interface member 40 includes a mounting bracket 44 at the second end having a plurality of flanges 46 extending outwardly with an aperture 48 extending through each of the flanges 46. The mounting bracket 44 also has a plurality of apertures 49 extending therethough. The mounting bracket 44 is made of a metal material such as aluminum.

The shoulder assembly 30 also includes a scapula 50 mounted to the mounting bracket 44 of the spine interface member 40. The scapula 50 is made of a plastic material such as polyurethane. The scapula 50 has a base portion 52 extending laterally and a socket portion 54 extending axially from the base portion 52 and having a socket 56 to receive a shoulder ball assembly 57. The shoulder ball assembly 57 is made of a metal material such as steel and aluminum. The shoulder ball assembly 57 has one end disposed in the socket 56 and connected to the socket portion 54. The socket portion 54 has one or more apertures 58 extending through the socket 56 to receive a suitable mechanism such as fasteners 60 to threadably engage the apertures 49 in the mounting bracket 44. In addition, a suitable mechanism such as a fastener 62 and wave washer (not shown) may be used to extend through an aperture 48 in a lower flange 46 of the mounting bracket 44 to secure the scapula 50 to the mounting bracket 44. It should be appreciated that a clavicle 59 is connected to the scapula 50 by a suitable mechanism such as a fastener. It should also be appreciated that the shoulder ball assembly 57 is connected to the arm assembly 18, 20.

Referring to FIGS. 5 through 9, a lateral impact shoulder assembly 130, according to one embodiment of the present invention, is shown for the crash test dummy 12. The lateral impact shoulder assembly 130 may be used to replace the frontal impact shoulder assembly 30. Like parts of the shoulder assembly 30 have like reference numerals increased by one hundred (100). It should be appreciated that the shoulder assembly 130 is supplied as a kit for the crash test dummy 12 to allow for lateral impact testing on the shoulder area and spine area of the crash test dummy 12.

The shoulder assembly 130 includes a spine interface member 140 connected to the spine assembly 15. The spine interface member 140 is made of a flexible material. The flexible material is an elastomeric material such as rubber. The spine interface member 140 also includes a mounting bracket 141 and a mounting bracket 144 having a plurality of flanges 146 extending outwardly with an aperture 148 extending through each of the flanges 146. The mounting bracket 144 also has a plurality of apertures 149 extending therethough. The mounting bracket 141 is connected to the spine box 34 by the fasteners 142. It should be appreciated that the mounting brackets 141 and 144 are made of a metal material such as aluminum.

The shoulder assembly 130 also includes a scapula 150 made of a flexible material. The flexible material is a plastic material such as polyurethane. The scapula 150 is mounted to the mounting bracket 144 of the spine interface member 140. The scapula 150 has a base portion 152 extending laterally and a socket portion 154 extending axially from the base portion 152 and having a socket 156 therein. The socket 156 has an aperture 157 extending through the socket portion 154. The scapula 150 also has a recess 166 on a back side of the socket portion 154 to clear the clavicle 59. The scapula 150 is integral, unitary, and one-piece. It should be appreciated that the scapula 150 is connected to the mounting bracket 144 by the fastener 162 as well as clamped by a rim of a load cell 168 to be described.

The shoulder assembly 130 includes a load cell 168 to measure load. The load cell 168 is a three-axis (Fx, Fy, Fz), three channel, shoulder load cell for measuring load of the shoulder joint. The load cell 168 has capacity of Fx (forward) 2000N, Fy (lateral) 4000N, and Fz (upward) 2000N. The load cell 168 is attached with a plurality of fasteners 170 such as three (3) M5 countersunk screws to the mounting bracket 144. The shoulder assembly 130 also includes a first accelerometer 171 such as a shoulder joint uni-axial accelerometer (lateral direction). The first accelerometer 171 is disposed on the mounting bracket 144 of the spine interface member 140. It should be appreciated that the accelerometer 171 is a shoulder joint accelerometer to measure acceleration of the shoulder joint. It should also be appreciated that the load cell 168 is connected by a wire 168a or the like and accelerometer 171 is connected by a wire 171a or the like to an electronic unit (not shown) such as a data acquisition system.

The shoulder assembly 130 also includes a shoulder joint block 176 with a plurality of friction fasteners 178 such as two (2) set screws to apply friction to the shoulder joint for flexion and extension range of motion. The shoulder joint block 176 is made of a metal material such as bronze. The shoulder joint block 176 is attached to the load cell 168 with at least one attachment fastener such as a screw 180, a metal washer 182, and a waved washer 184 to eliminate joint play.

The shoulder assembly 130 further includes an upper arm member 186 of an arm assembly 118, 120 extending axially and an integral bone 188 disposed therein and extending axially. The upper arm member 186 is made as solid flesh extending around the bone 188. The bone 188 is made of a plastic material such as nylon. The bone 188 has one end attached to the shoulder assembly 130 with a plurality of fasteners 190 such as two shoulder screws to the shoulder joint block 176. It should be appreciated that the arm assembly 118, 120 is substituted for the arm assembly 18, 20 for lateral impact testing of the crash test dummy 12.

Referring to FIGS. 2, 3, 5, and 9, the shoulder assembly 130 is provided as a shoulder kit assembly and further includes a lower neck interface ring 192 connected to the lower end 35 of the neck 32 and the top end of the spine box 34. The lower neck interface ring 192 may include a mount 194 for a second accelerometer 196. The second accelerometer 196 is a T1 accelerometer to measure acceleration on the T1 location of the spine. The ring 192 is generally planar and circular in shape. The ring 192 has a planar area 193 on a side thereof. The mount 194 is connected to the planar area 193 of the ring 192 by a suitable mechanism such as a plurality of, preferably two fasteners 197 engaging apertures 197a in the planar area 193 of the ring 192. The ring 192 is made of a rigid material such as metal. The ring 192 has a plurality of apertures 198 extending axially therethrough. The apertures 198 receive a suitable mechanism such as the fasteners 36 that extend therethrough to secure the ring 192 to the spine assembly 15. It should be appreciated that the ring 192 is disposed between the lower end 35 of the neck 32 and the upper end of the spine box 34 of the spine assembly 15. It should also be appreciated that the second accelerometer 196 is connected by a wire 196a, cable, or the like to a data acquisition system (not shown). It should further be appreciated that a lifting ring 200 may extend through an aperture in the ring 192 to allow lifting of the crash test dummy 10. It should still further be appreciated that the lower neck interface ring 192, mount 194, and second accelerometer 196 are new and part of the shoulder kit assembly of the present invention.

To disassemble the frontal impact shoulder assembly 30 of the crash test dummy 12, a neck shield of the covering 28 is removed. The arm 18, 20 is removed by detaching the fasteners that attach the clavicle 59 to a shoulder interface member 40. The shoulder interface member 40 is detached by the fasteners 42 that attach the interface member 40 to the spine box 34. In addition, the head assembly 14 and neck 32 are detached from the spine box 34 by removing the fasteners 36.

To assemble the lateral impact shoulder assembly 130, the shoulder interface member 140 is attached by the fasteners 142 to the spine box 34. The lower neck interface ring 192 is placed adjacent the spine box 34 and attached to the neck 32 replaced with the fasteners 36. The arms 118, 120 are reattached by the fasteners that attach the clavicle 59 to a shoulder interface member 140. The operation is repeated in reverse for disassembly of the lateral impact shoulder assembly 130 and assembly of the frontal impact shoulder assembly 30 to the crash test dummy 12.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A shoulder kit assembly for a crash test dummy comprising:
   a spine interface member having a mounting bracket for attachment to a spine of the crash test dummy;
   a scapula made of a flexible material for attachment to said spine interface member and having a socket with an aperture extending therethrough;
   a load cell disposed on said mounting bracket and having a first portion for attachment to said spine interface member and a second portion extending through said aperture in said socket for measuring load in a plurality of axes on a shoulder joint; and
   an upper arm assembly having an arm bone made of a plastic material for operative attachment to said scapula.

2. A shoulder kit assembly as set forth in claim 1 including a ring interface for attachment to the spine of the crash test dummy, said ring interface having a planar area thereon.

3. A shoulder kit assembly as set forth in claim 2 including a mount attached to said planar area of said ring interface.

4. A shoulder kit assembly as set forth in claim 3 including an accelerometer for mounting to said mount to measure acceleration at a T1 location of the spine.

5. A shoulder kit assembly for a crash test dummy comprising:
   a spine interface member for attachment to a spine of the crash test dummy;
   a scapula for attachment to said spine interface member;
   a load cell for attachment to said spine interface member for measuring load in a plurality of axes on a shoulder joint;
   an upper arm assembly having an arm bone made of a plastic material for operative attachment to said scapula; and
   a shoulder joint block attached to said load cell to apply friction to the shoulder joint.

6. A shoulder kit assembly as set forth in claim 5 including at least one attachment fastener such as a screw, a metal washer, and a waved washer attached to said shoulder joint block to eliminate shoulder joint play.

7. A shoulder kit assembly as set forth in claim 5 wherein said arm assembly includes an upper arm flesh molded around said arm bone and said arm bone is attached to said shoulder joint block.

8. A shoulder kit assembly as set forth in claim 5 including a shoulder joint accelerometer attached to said spine interface member to measure acceleration on the shoulder joint.

9. A shoulder assembly for a crash test dummy comprising:
   a spine interface member having a mounting bracket for attachment to a spine of the crash test dummy;
   a scapula made of a flexible material attached to said spine interface member and having a socket with an aperture extending therethrough;
   a load cell disposed on said mounting bracket and having a first portion attached to said spine interface member and a second portion extending through said aperture in said socket for measuring load in a plurality of axes on a shoulder joint; and
   an upper arm assembly having an arm bone made of a plastic material operatively attached to said scapula.

10. A shoulder assembly for a crash test dummy comprising:
    a spine interface member for attachment to a spine of the crash test dummy;
    a scapula attached to said spine interface member;
    a load cell attached to said spine interface member for measuring load in a plurality of axes on a shoulder joint;
    an upper arm assembly having an arm bone made of a plastic material operatively attached to said scapula; and
    a shoulder joint block attached to said load cell to apply friction to the shoulder joint.

11. A shoulder assembly as set forth in claim 10 including at least one attachment fastener such as a screw, a metal washer, and a waved washer attached to said shoulder joint block to eliminate shoulder joint play.

12. A shoulder assembly as set forth in claim 10 wherein said arm assembly includes an upper arm flesh molded around said arm bone and said arm bone is attached to said shoulder joint block.

13. A shoulder assembly as set forth in claim 10 including a shoulder joint accelerometer attached to said spine interface member to measure acceleration on the shoulder joint.

14. A crash test dummy comprising:
    a body;
    a spine assembly operatively attached to said body; and
    a shoulder assembly operatively attached to said spine assembly and comprising a spine interface member attached to said spine assembly, a scapula attached to said spine interface member, a load cell attached to said spine interface member for measuring load in a plurality of axes on a shoulder joint, a shoulder joint block attached to said load cell to apply friction to the shoulder joint, and an upper arm assembly having an arm bone made of a plastic material attached to said shoulder joint block.

15. A crash test dummy as set forth in claim 14 including a ring interface attached to said spine assembly, said ring interface having a planar area thereon.

16. A crash test dummy as set forth in claim 15 including a mount attached to said planar area of said ring interface.

17. A crash test dummy as set forth in claim 16 including an accelerometer for mounting to said mount to measure acceleration at a T1 location of the spine.

18. A crash test dummy as set forth in claim 14 including at least one attachment fastener such as a screw, a metal washer, and a waved washer attached to said shoulder joint block to eliminate shoulder joint play.

19. A crash test dummy as set forth in claim 14 wherein said arm assembly includes an upper arm flesh molded around said arm bone.

20. A crash test dummy as set forth in claim 14 including a shoulder joint accelerometer attached to said spine interface member to measure acceleration on the shoulder joint.

* * * * *